United States Patent
Matsuoka

(10) Patent No.: US 9,772,544 B2
(45) Date of Patent: Sep. 26, 2017

(54) TWO-DIMENSIONAL SCANNING PROJECTOR

(75) Inventor: Shohei Matsuoka, Tokyo (JP)

(73) Assignee: PRYSM, INC., San Jose, CA (US)

( * ) Notice: Subject to any disclaimer, the term of this patent is extended or adjusted under 35 U.S.C. 154(b) by 654 days.

(21) Appl. No.: 12/891,712

(22) Filed: Sep. 27, 2010

(65) Prior Publication Data

US 2011/0013247 A1 Jan. 20, 2011

Related U.S. Application Data

(63) Continuation-in-part of application No. PCT/JP2008/068641, filed on Oct. 15, 2008.

(30) Foreign Application Priority Data

Mar. 26, 2008 (JP) ................. 2008-079766

(51) Int. Cl.
G02B 26/10 (2006.01)
G03B 21/00 (2006.01)

(52) U.S. Cl.
CPC ........... *G03B 21/00* (2013.01); *G02B 26/101* (2013.01)

(58) Field of Classification Search
USPC .................. 359/196.1–226.3; 353/98–99
See application file for complete search history.

(56) References Cited

U.S. PATENT DOCUMENTS 5,583,559 A * 12/1996 Nakamura et al. ........... 347/260
6,842,274 B2 * 1/2005 Akatsu et al. ............. 359/204.1
2002/0018273 A1 * 2/2002 Iizuka ........................... 359/198
2004/0080799 A1 4/2004 Ishihara
2004/0155950 A1 * 8/2004 Takeuchi et al. ............. 347/129
2004/0184127 A1 * 9/2004 Nakajima et al. ............ 359/204
2005/0105156 A1 * 5/2005 Ono et al. ..................... 359/204

(Continued)

FOREIGN PATENT DOCUMENTS

JP 2004-138719 A 5/2004
JP 2005-157111 A 6/2005
JP 2007-024938 A 2/2007

OTHER PUBLICATIONS

Office Action received for Great Britain Patent Application No. 1018022.2, mailed on Oct. 24, 2011, 3 pages.

(Continued)

*Primary Examiner* — Kimberly N Kakalec
(74) *Attorney, Agent, or Firm* — Patterson & Sheridan, LLP

(57) ABSTRACT

A two-dimensional scanning projector causing a light beam to scan in a first direction and a second direction orthogonal to the first direction, comprising: a first deflector which deflects the light beam in the first direction; and a scanning optical system arranged between the first deflector and a scanned surface, wherein the first deflector is arranged such that a rotation axis of the first deflector is inclined, in a plane including an optical axis of the scanning optical system and the second direction, by a first angle with respect to the second direction, and the light beam is incident on the first deflector such that, in the plane including the optical axis and the second direction, a chief ray of the light beam entering a center of a projected image is obliquely incident on the first deflector to form a second angle with respect to the optical axis.

2 Claims, 12 Drawing Sheets

(56) References Cited

U.S. PATENT DOCUMENTS

| | | |
|---|---|---|
| 2005/0117188 A1 | 6/2005 | Ishihara |
| 2005/0179971 A1* | 8/2005 | Amada et al. ............... 359/196 |
| 2005/0213177 A1* | 9/2005 | Abe ............................. 359/206 |
| 2006/0285186 A1* | 12/2006 | Ishida et al. ................. 359/204 |
| 2007/0013876 A1 | 1/2007 | Agatsuma |
| 2007/0064291 A1* | 3/2007 | Kashimura ................... 359/204 |
| 2007/0081215 A1 | 4/2007 | Shiraishi |

OTHER PUBLICATIONS

International Preliminary Report on Patentability received for PCT Patent Application No. PCT/JP2008/06841, completed on Apr. 27, 2010, 9 pages (3 pages of English translation and 6 pages of IPRP).
International Search Report of PCT/JP2008/068641, dated Jan. 20, 2009, 2 pages (Translation enclosed, 1 page).

* cited by examiner

TWO-DIMENSIONAL SCANNING PROJECTOR

CROSS REFERENCE TO RELATED APPLICATION

This is a Continuation-in-Part of International Application No. PCT/JP2008/068641 filed Oct. 15, 2008, which claims priority from Japanese Patent Application No. 2008-079766 filed Mar. 26, 2008. The entire disclosures of the prior applications are hereby incorporated by reference herein their entireties.

TECHNICAL FIELD

The present application relates to a two-dimensional scanning projector which enlarges and projects, on a predetermined scanned surface, an image generated by causing a light beam emitted from a light source to scan in two dimensions.

BACKGROUND

Recently, a two-dimensional scanning projector which enlarges and projects, on a scanned surface such as a screen, an image generated by causing a light beam emitted from a light source to scan in two dimensions is known. Furthermore, regarding a two-dimensional scanning projector, a device configured such that an optical axis of a scanning optical system is inclined with respect to the screen is known. The two-dimensional scanning projector configured as described above projects an image to the entire screen from an image generation unit arranged under the screen. Thus the configured two-dimensional scanning projector enables so-called shooting-up projection (which is also called tilting projection and means "projection where a light ray proceeding to the center of the screen is tilted with respect to the screen") in which an image is projected to the entire screen from an image generation unit arranged under the screen. The device capable of performing shooting-up projection is able to achieve space-saving in comparison with a conventional non-shooting-up type projector in which an optical axis of a scanning optical system is substantially orthogonal to the screen.

However, there is a problem that the image projected by the device capable of performing the shooting-up projection has larger TV distortion and trapezoidal distortion relative to the image projected by the non-shooting-up type projector. The TV distortion as used herein means a distortion of an image projected on the screen. Specifically, the TV distortion is represented by a numeric value of a distortion of the longer of a projected image to the shorter side of the projected image. For example, Japanese Patent Provisional Publication No. 2004-138719A discloses a technique for reducing the TV distortion in a projector.

The publication 2004-138719A discloses a two-dimensional scanning projector in which a scanning optical system is arranged between a light source and a screen. In the projector, the scanning optical system is arranged to be decentered. With this configuration, a designer of the projector tries to correct the TV distortion and etc. by giving an anamorphic effect to a projecting optical system.

However, since the projector described in the publication 2004-138719A is configured such that the scanning optical system is decentered, the configuration of the projector becomes inevitably complicated. In addition, positioning of lenses with a high degree of accuracy is required.

SUMMARY

In view of the above described circumstances, one aspect of the present invention is to provided a two-dimensional scanning projector capable of performing so-called shooting-up projection and capable of effectively compensating for reduction in image quality such as TV distortion and trapezoidal distortion without employing a configuration which is complicated and requires a high degree of accuracy.

With respect to the above described aspect, according to one embodiment of the invention, there is provided a two-dimensional scanning projector causing a light beam emitted from a light source to scan in a first direction and a second direction orthogonal to the first direction to project a two-dimensional image on a scanned surface, comprising: a first deflector which deflects the light beam in the first direction; and a scanning optical system arranged between the first deflector and the scanned surface. The first deflector is arranged such that a rotation axis of the first deflector is inclined, in a plane including an optical axis of the scanning optical system and the second direction, by a first angle with respect to the second direction. The light beam emitted from the light source is incident on the first deflector such that, in the plane including the optical axis and the second direction, a chief ray of the light beam entering a center of a projected image is obliquely incident on the first deflector to form a second angle with respect to the optical axis.

In at least one aspect, the scanning optical system may be configured such that center axes of optical components configuring the scanning optical system are collinear with each other to define an optical axis of the scanning optical system. In this case, each of the optical components has a power rotationally symmetrical with respect to the optical axis, and a center of the scanned surface is shifted, in the second direction, from an intersection of the optical axis and a plane including the scanned surface.

According to one embodiment of the invention, it is preferable that the two-dimensional scanning projector satisfies the following two conditions. In this case, H represents a distance between the intersection and a center of a lower side of the screen, D represents a distance between the intersection and one end of the lower side of the screen, H" represents a distance between the intersection and a center of an upper side of the screen, D" represents a distance between the intersection and one end of the upper side of the screen, f represents a focal length of the scanning optical system, α represents a half angle of view in the first direction, ρ represents the first angle, β represents the second angle, and ω represents a half angle of view in the second direction.

$$\frac{\tan\rho + \tan(\beta + \omega)/\cos\alpha}{1 - \tan\rho\tan(\beta + \omega)/\cos\alpha} \geq H''\frac{\tan(D''/f)}{D''} \qquad (1)$$

$$\frac{\tan\rho + \tan(\beta - \omega)/\cos\alpha}{1 - \tan\rho\tan(\beta - \omega)/\cos\alpha} \leq H\frac{\tan(D/f)}{D} \qquad (2)$$

According to one embodiment of the invention, it is preferable that the two-dimensional scanning projector further satisfies a following condition. In this case, H' represents a distance between the intersection and a center of the screen, and D' represents a distance between the intersection and a center of a lateral side of the screen.

$$\frac{\tan\rho + \tan\beta/\cos\alpha}{1 - \tan\rho\tan\beta/\cos\alpha} \leq H' \frac{\tan(D'/f)}{D'} \quad (3)$$

According to one embodiment of the invention, the two-dimensional scanning projector may further comprise: a second deflector which is arranged between the light source and the first deflector and which deflects the light beam in the second direction; and a relaying optical system which is arranged between the first deflector and the second deflector and which directs the light beam emitted by the second deflector to the first deflector.

According to the two-dimensional scanning projector of one embodiment of the invention, the light source may include a plurality of light emitting units aligned in a direction corresponding to the second direction, and the two-dimensional scanning projector may further comprise a collecting optical system which is arranged between the light source and the first deflector and which is configured to cause a plurality of light beams emitted from the plurality of light emitting units to be incident simultaneously on the first deflector. In this case, two-dimensional scanning is achieved by causing the plurality of light beams to simultaneously scan on the scanned surface in the first direction.

According to the two-dimensional scanning projector of one embodiment of the invention, it is preferable that the first angle and the second angle are set to have a same sign and are set such that, in the plane including the optical axis and the second direction, an angle formed between the chief ray incident on the first deflector and a plane with which the rotation axis of the first deflector orthogonally intersects is smaller than the second angle.

According to the two-dimensional scanning projector of one embodiment of the invention, the scanning optical system may have at least one reflector contributing to maintaining a constant velocity of scanning on the scanned surface.

It is preferable that the scanning optical system mounted on the two-dimensional scanning projector has a negative distortion defined from an fθ property satisfying f(β+ω)≤ H"≤f tan(β+ω) to an f tan θ property.

According to the two-dimensional scanning projector, even when the projector is configured as a shooting-up projection type projector, it is possible to effectively suppress the TV distortion and the trapezoidal distortion without using the conventional complicated and high-precision scanning optical system

BRIEF DESCRIPTION OF THE ACCOMPANYING DRAWINGS

DETAILED DESCRIPTION OF EMBODIMENTS

Figure 1:
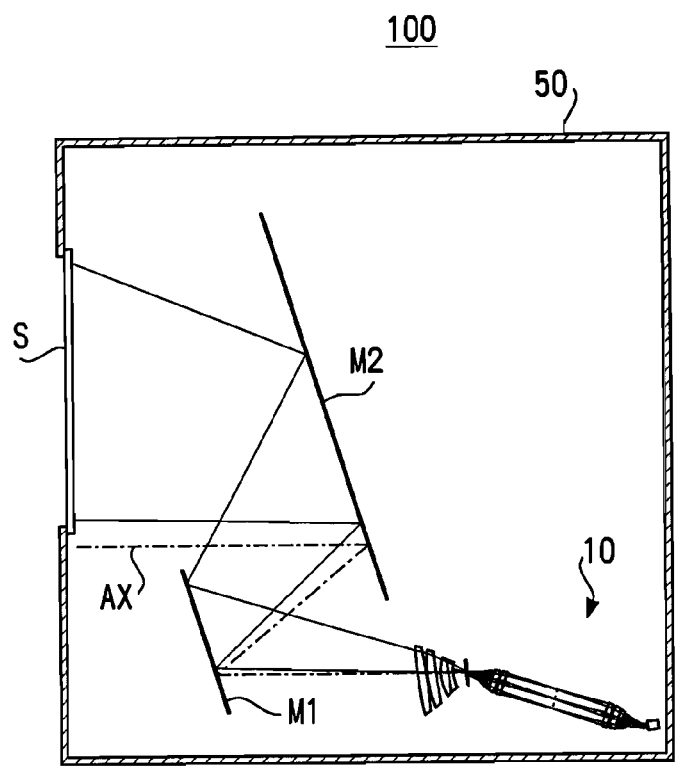
FIG. 1 is an auxiliary scanning cross section illustrating a general configuration of a two-dimensional scanning projector according to an embodiment of the invention.
Figure 1:
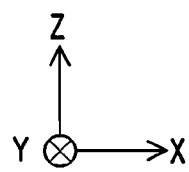

FIG. 1 illustrates a general configuration of a shooting-up projection type two-dimensional scanning projector 100 according to an embodiment of the invention. The projector 100 has a projecting optical system 10, a first mirror M1 and a second mirror M2 and a screen S in a housing 50.

Figure 2:
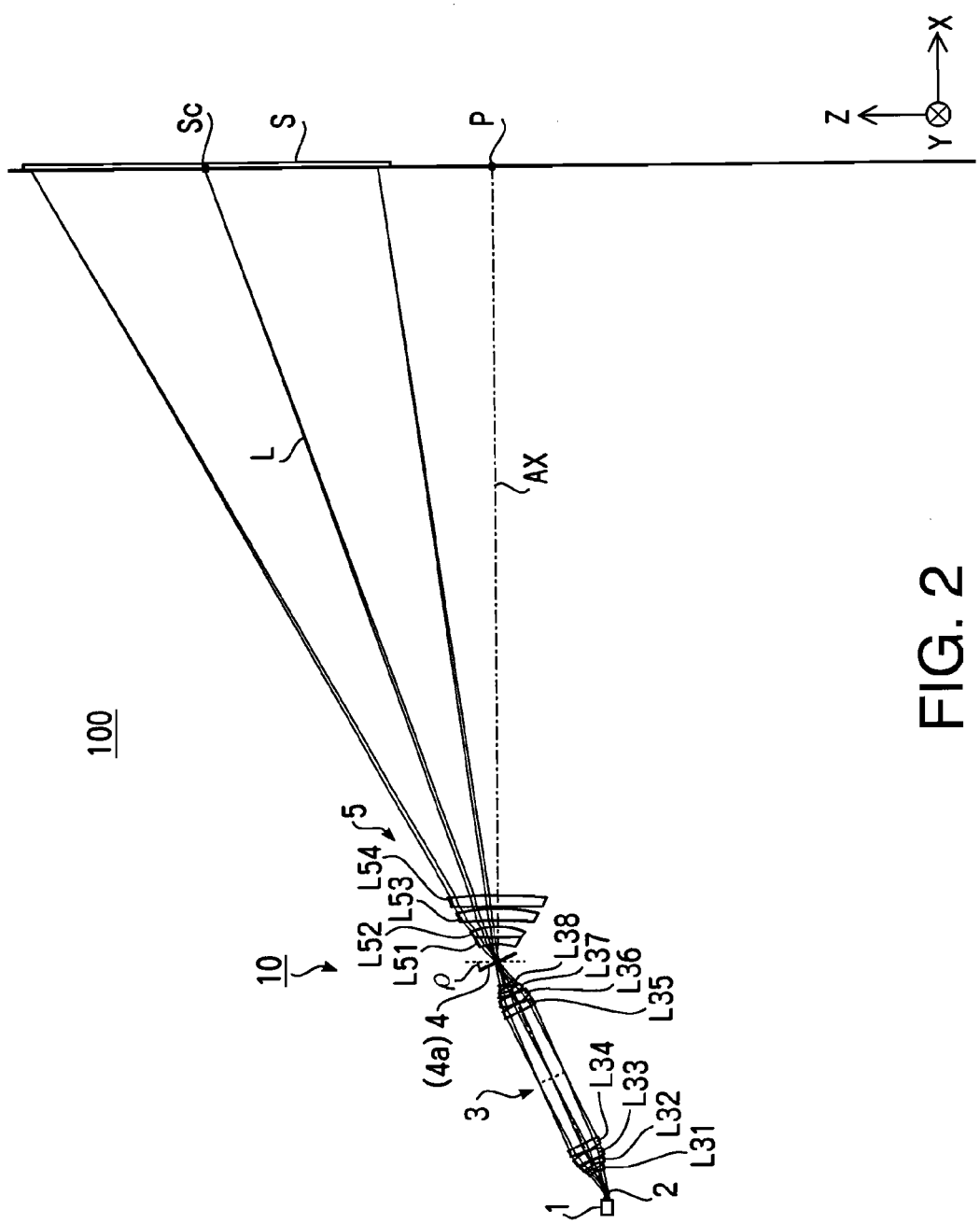
FIG. 2 illustrates a developed optical path in the two-dimensional scanning projector according to the embodiment of the invention.

FIG. 2 illustrates a developed optical path in the two-dimensional scanning projector 100. In FIG. 2, a reflection optical path by the first mirror M1 and the second mirror M2 is developed. As shown in FIG. 2, the projecting optical system 10 has a light source unit 1, a second deflector 2, a relaying optical system 3, a first deflector 4 and a scanning optical system 5. An axis AX indicated by a chain line is an optical axis of the scanning optical system 5.

In the following, a direction of a normal to the optical axis AX of the scanning optical system 5 defined in a sectional plane including the optical axis AX of the scanning optical system 5 and a rotation axis of the first deflector 4 is defined as a longitudinal direction, and a direction perpendicular to both of the optical axis AX and the normal is defined as a lateral direction. For example, when the two-dimensional scanning projector 100 whose entire outer shape is regarded as a substantially rectangular parallelepiped shape is placed on a horizontal surface, the lateral direction is in parallel with the horizontal surface on which the two-dimensional scanning projector 100 is placed and is equal to a first direction, and the longitudinal direction coincides with the vertical direction and is equal to a second direction. In the following, the first deflector 4 and the second deflector 2 are referred to as a lateral deflector 4 and a longitudinal deflector 2, respectively.

In FIGS. 1 and 2, the lateral direction is represented as Y direction, and the longitudinal direction is represented as Z direction. A direction orthogonal to both of Y and Z directions, i.e., a depth direction of the device orthogonal to the screen S which is a scanned surface, is defined as X direction.

In actuality, there is a case where, in addition to the first and second mirrors M1 and M2, a mirror (not shown) is placed in the projecting optical system 10 to fold the optical path in the projector 100. However, in the following, folding of the optical path by each mirror is not considered, and each component is explained assuming that the optical path is developed.

The light source unit 1 shown in FIG. 2 emits laser light which is on/off modulated in accordance with an externally input signal, such as an image signal. The laser light emitted by the light source unit 1 is incident on the longitudinal deflector 2.

The longitudinal deflector 2 is configured to be able to rotate about a center axis orthogonal to a paper surface of FIG. 2. That is, the longitudinal deflector 2 is a deflector for causing the laser light to scan in the longitudinal direction on the screen S.

The laser light deflected by a deflecting surface of the longitudinal deflector 2 is then incident on the lateral deflector 4 through the relaying optical system 3. In FIG. 2, for convenience of illustration, only the center axis of the lateral deflector 4 is illustrated. The relaying optical system 3 according to the embodiment includes a front group having lenses L31 to L 34 and a rear group having lenses L35 to L38. In FIG. 2, a dashed line placed in a middle part of the relaying optical system 3 indicates a position where an intermediate image is formed. In this embodiment, an axial light beam in the relaying optical system 3 is incident at a substantially central position on the screen S. That is, the axial light beam in the relaying optical system 3 generates a central area of a projected image.

The lateral deflector 4 is configured to be able to rotate about a center axis which is parallel with the paper surface of FIG. 2. That is, the lateral deflector 4 is a deflector for causing the incident laser light to scan in the lateral direction on the screen S.

The laser light is incident on the scanning optical system 5 while being continuously deflected at an angle corresponding to a rotated state of the lateral deflector 4. It should be noted that, in this embodiment, the scanning optical system 5 includes four lenses L51 to L54, and totally has an fθ property. However, the number of lenses configuring the scanning optical system 5 is one example. Each of the lenses L51 to L54 of the scanning optical system 5 is not decentered. That is, the center axes of the lenses coincide with each other, and constitute the optical axis AX of the scanning optical system 5. Each of the lenses L51 to L54 has a rotationally-symmetric power with respect to the optical axis AX.

The laser light emerging from the scanning optical system 5 scans on the screen S in the lateral direction. As described above, the two-dimensional scanning projector 100 according to the embodiment is configured as a shooting-up projection type. Therefore, as shown in FIG. 2, the center Sc of the screen S is shifted, in the longitudinal direction (i.e., Z direction), from an intersection P at which the optical axis AX intersects with a plane (Y-Z surface) including the screen S.

In the two-dimensional scanning projector 100, the longitudinal deflector 2 rotates by a predetermined amount per one scanning by the lateral deflector 4 in the lateral direction. The predetermined amount is defined as an amount corresponding to a length obtained by multiplying the number of laser beams simultaneously used for scanning on the screen S by the size of a spot formed by each laser beam on the screen S. By repeating the scanning, a two-dimensional image is formed on the screen S. That is, the screen S which is a scanned surface in the embodiment is immovable with respect to the scanning optical system 5 in contrast to a rotatable photosensitive drum.

Figure 12:
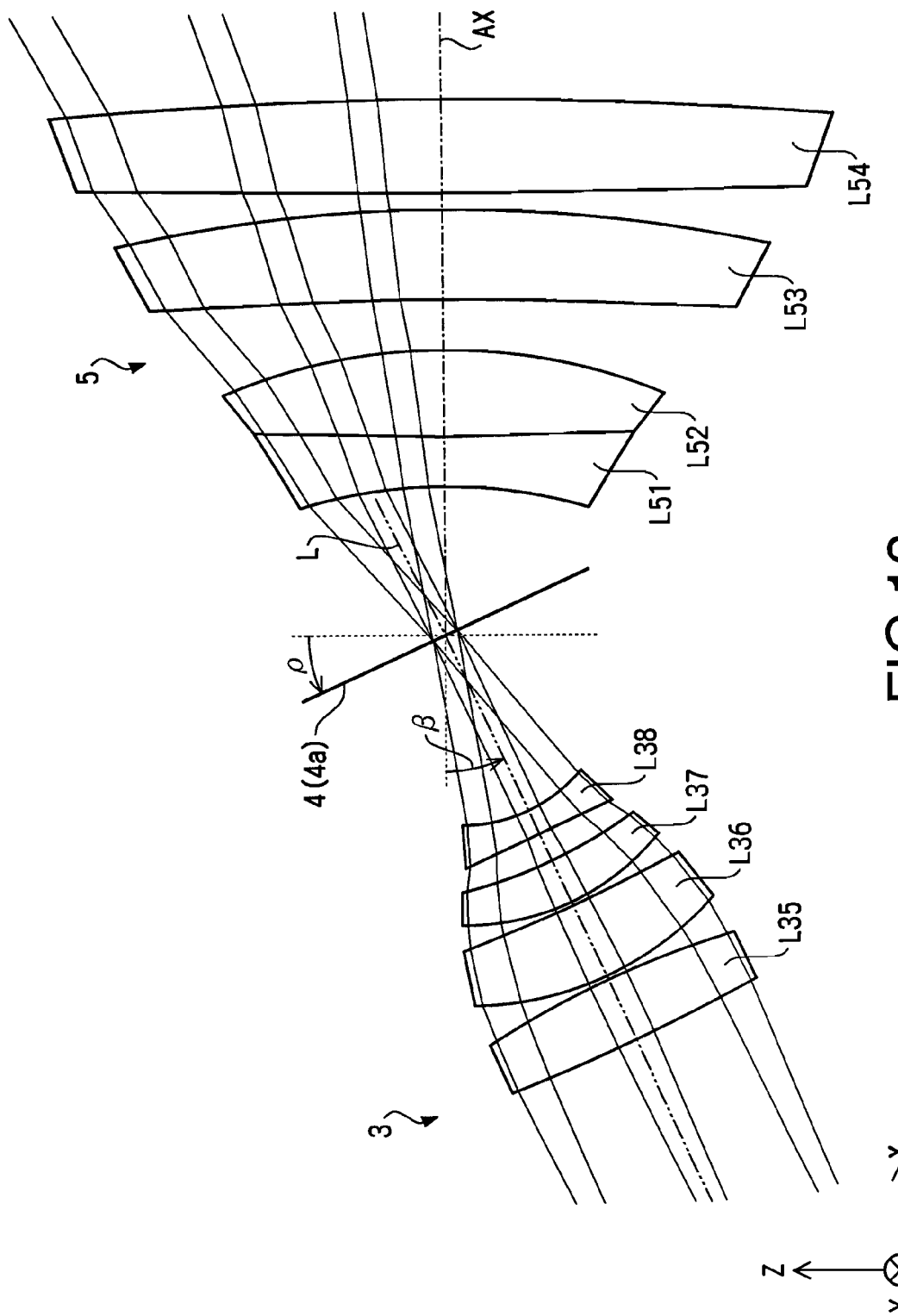
FIG. 12 is an enlarged view of an optical system around a lateral deflector shown in FIG. 2.

In the two-dimensional scanning projector 100 configured as described above, the lateral deflector 4 is arranged such that the center axis 4a of the deflector 4 is inclined with respect to Z direction. That is, the lateral deflector 4 is arranged such that an angle (hereafter, referred to as a first angle ρ) formed between its own center axis and Z direction takes a value other than 0°. The angle (first angle ρ) is 0° when the center axis coincides with Z direction, and the direction (counterclockwise direction) indicated by an arrow shown in FIG. 12 is defined as positive. FIG. 12 is an enlarged view illustrating an optical system around the lateral deflector 4.

Furthermore, the two-dimensional scanning projector 100 is configured such that the light beam which has passed through the relaying optical system 3 is incident obliquely on the lateral deflector 4. Specifically, the two-dimensional scanning projector 100 is configured such that, of the light beams incident on the lateral deflector 4, a chief ray L of the light beam which will pass through the center Sc of the screen S forms a second angle β with respect to the optical axis AX in X-Z plane when the light beam is incident on the lateral deflector 4. It should be noted that the second angle β takes a vale other than 0°. When the chief ray L incident on the lateral deflector 4 is included in X-Y plane, the second angle β is 0°. In FIG. 12, the direction (counterclockwise direction) indicated by an arrow is defined as positive.

As described above, the two-dimensional scanning projector 100 according to the embodiment is configured such that the lateral deflector 4 is inclined and the light beam is incident obliquely on the lateral deflector 4. With this configuration, the following advantages can be obtained.

First, it becomes possible to suitably suppress TV distortion, which would occur in a shooting-up projection type projector, to a level substantially equal to TV distortion of a non-shooting-up projection type projector. In general, the light beam scanned in the plane (which is referred to as a rotational cross section for convenience) orthogonal to the center axis of the lateral deflector 4 does not cause a bow of a scanning line. Besides, particularly in the case of the light beam scanning in the rotational cross section including the optical axis AX, the light beam does not cause a bow in the longitudinal direction. Therefore, the lateral deflector 4 is inclined, so that the rotational cross section and a projected image on the screen S approach with respect to each other. That is, since the projected image can be formed by the optically suitable light beam scanned in the vicinity of the rotational cross section, TV distortion can be suitably suppressed. In other words, the incident angle of the chief ray L with respect to the lateral deflector 4 (the rotational cross section) can be made smaller relative to the second angle β. Therefore, the bow of a scanning line can be suitably suppressed, and an image having a small degree of TV distortion can be projected on the screen S.

Second, it becomes possible to suppress the trapezoidal distortion, which would occur in a shooting-up projection type projector, to a level of the trapezoidal distortion of a non-shooting-up projection type projector. Specifically, by inclining the lateral deflector 4, an image (a reflection image by the lateral deflector 4) formed through the lateral deflector 4 is also inclined. That is, by inclining the lateral deflector 4 at an appropriate angle, a distortion which cancels the trapezoidal distortion due to the shooting-up projection can be given to the image.

Third, by inclining the lateral deflector 4, it becomes possible to increase an apparent angle of view. As a result, it becomes possible to widen the scanning range at a certain height on the screen S in comparison with the case where the lateral deflector 4 is not inclined.

Fourth, it becomes possible to suppress some phenomena which would occur due to the light beam being obliquely incident on the lateral deflector 4. In general, as the amount of inclination of the light beam being incident on the lateral deflector 4 increases, i.e., as the incident angle on the lateral deflector 4 increases, the diameter of the spot formed by the incident light beam on the deflection surface of the lateral deflector 4 increases. Since the diameter of the spot increases, the beam rotation (a phenomenon where the beam spot formed on the screen S rotates depending on the deflection angle of the light beam deflected by the lateral deflector 4) is largely caused at the time of reflection. By arranging the lateral deflector 4 to be inclined, it becomes possible to reduce the incident angle of the light beam at the lateral deflector 4. Consequently, it becomes possible to effectively suppress the above described phenomena.

In order to enhance the effectiveness of the above described fourth advantage, the two-dimensional scanning projector 100 according to the embodiment is configured such that the first angle $\rho$ and the second angle $\beta$ have the same sign.

Figure 3:
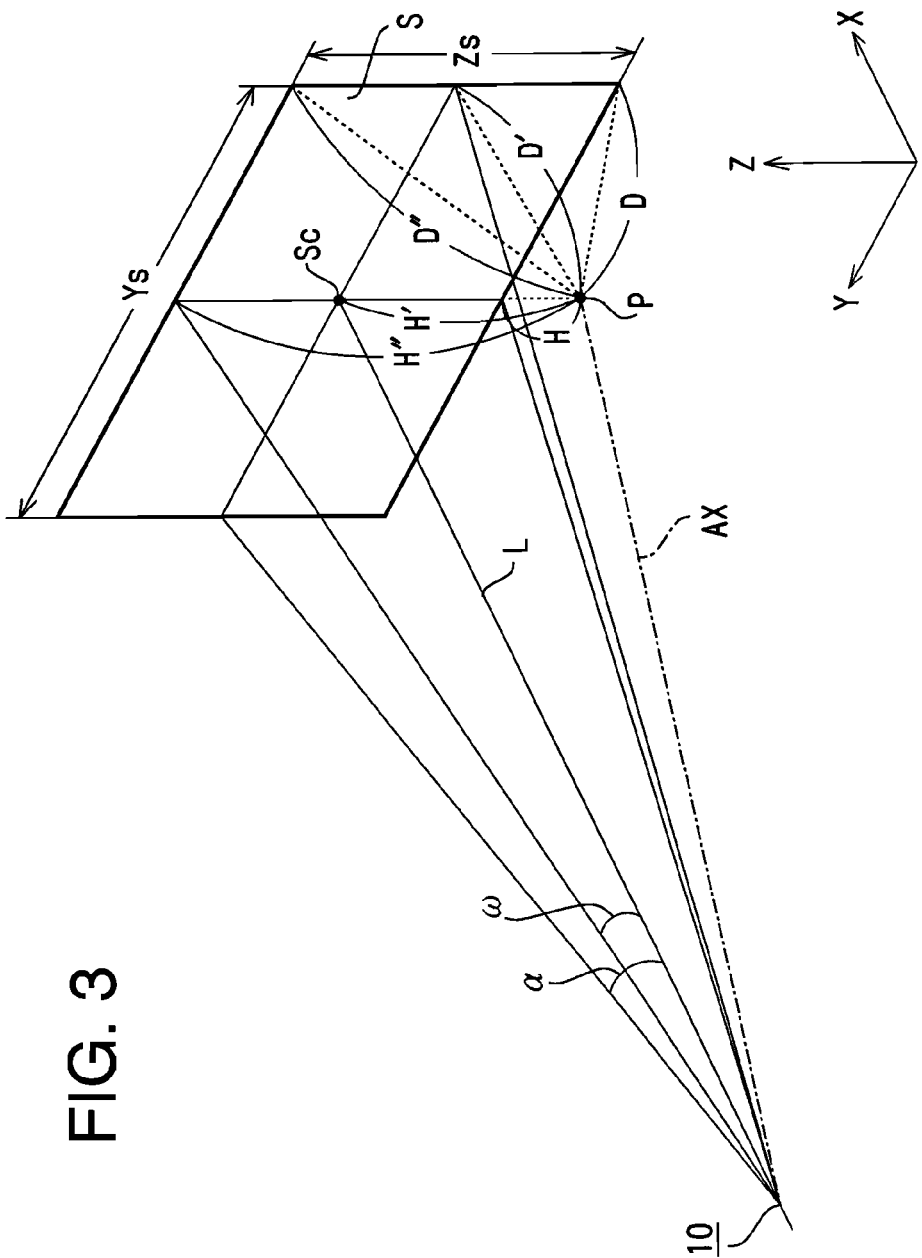
FIG. 3 is an explanatory illustration for explaining parameters relating to conditions which the two-dimensional scanning projector according to the embodiment of the invention satisfies.

In order to achieve the above described advantages, the two-dimensional scanning projector 100 is configured to satisfy the following conditions (1) and (2). In the case, H represents a distance between the intersection P and the center of the lower side of the screen S, D represents a distance between the intersection P and one end of the lower side of the screen S, H" represents a distance between the intersection P and the center of the upper side of the screen S, D" represents a distance between the intersection P and one end of the upper side of the screen S, f represents a focal length of the scanning optical system 5, $\alpha$ represents a half angle of view in the lateral direction, $\rho$ represents the first angle, $\beta$ represents the second angle, and $\omega$ represents a half angle of view in the longitudinal direction. These parameters are illustrated in FIG. 3.

$$\frac{\tan\rho + \tan(\beta + \omega)/\cos\alpha}{1 - \tan\rho\tan(\beta + \omega)/\cos\alpha} \geq H'' \frac{\tan(D''/f)}{D''} \quad (1)$$

$$\frac{\tan\rho + \tan(\beta - \omega)/\cos\alpha}{1 - \tan\rho\tan(\beta - \omega)/\cos\alpha} \leq H \frac{\tan(D/f)}{D} \quad (2)$$

The half angle of view $\alpha$ in the lateral direction can be obtained by the following equation. In this case, Ys represents the length of the screen in Y direction.

$\alpha = (Ys/f)/\cos(\beta+\rho)$

The half angle of view $\omega$ in the longitudinal direction can be obtained by the following equation. In this case, Zs represents the length of the screen S in Z direction.

$\omega = Zs/f$

The condition (1) is a condition to design the projector such that a scanning line positioned at the upper side of the screen S becomes a straight line or has a curve protruding toward the center Sc. The condition (2) is a condition to design the projector such that a scanning line positioned at the lower side of the screen S becomes a straight line or has a curve protruding toward the center Sc. More specifically, when each of the above described conditions (1) and (2) has a relation of an equal sign, the projected image has a rectangular shape. That is, in this case, both of the scanning line at the lower side of the screen S and the scanning line at the upper side of the screen S become substantially straight lines. In other cases, the projected image has a so-called spool-like shape. When the projected image is a rectangular shape or a spool-like shape, it becomes possible to project an image having a rectangular shape corresponding to the screen S without causing an area (i.e., non-display area) where no scanning line exists does not occur.

By further satisfying the following condition (3), it becomes possible to enhance the effectiveness of the above described advantages, In this case, H' represents a distance between the intersection P and the center of the screen S, and D' represents a distance between the intersection P and the center of the lateral side of the screen S.

$$\frac{\tan\rho + \tan\beta/\cos\alpha}{1 - \tan\rho\tan\beta/\cos\alpha} \leq H' \frac{\tan(D'/f)}{D'} \quad (3)$$

The condition (3) is a condition to decrease the TV distortion at the center of the screen S. Satisfying the condition (3) enables the two-dimensional scanning projector 100 to project a high quality image which is close to an image projected by a non-shooting-up projection type. Furthermore, by increasing the first angle $\rho$ within the range of satisfying the condition (3), it becomes possible to downsize and reduce the thickness of the device while securing a large angle of view, and to enhance the function of correcting the trapezoidal distortion.

Figure 4:
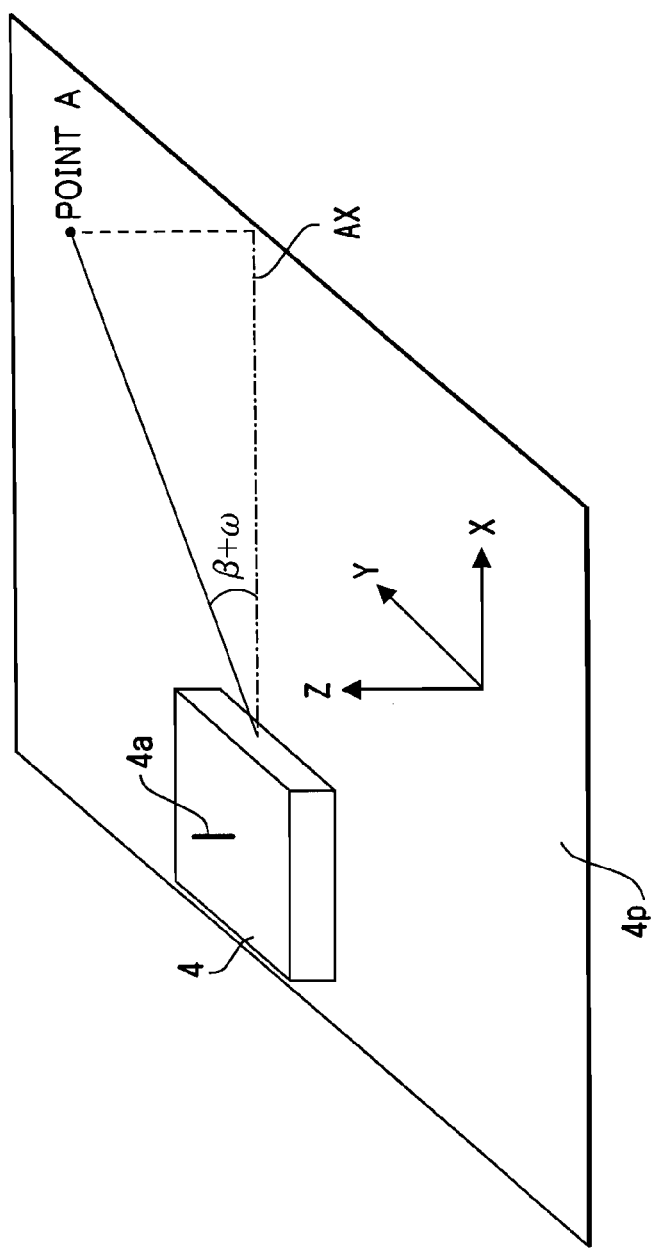
FIG. 4 is an explanatory illustration for deriving the conditions which the two-dimensional scanning projector according to the embodiment of the invention satisfies.

In the following, the processes of deriving the above described conditions (1) to (3) are explained with reference to FIGS. 4 to 7. FIG. 4 illustrates a situation where the lateral deflector 4 is placed in a state where the rotational cross section 4p is in parallel with the horizontal surface. That is, in FIG. 4, the lateral deflector 4 is placed such that the center axis 4a is parallel with Z direction. Let us consider the case where the light beam reflected from the lateral deflector 4 proceeds while having an angle ($\beta+\omega$) with respect to the rotational cross section 4p of the lateral deflector 4. In this case, we assume that the lateral deflector 4 is not rotated. That is, the light beam is not deflected by the lateral deflector 4, and the light beam proceeds on the X-Z plane including the optical axis AX of the scanning optical system 5.

Let us consider a point A which is shifted from the lateral deflector 4 by a constant distance (e.g., 1) along the optical path of the light beam in the illustration of FIG. 4. The coordinate (X, Y, Z) of the point A can be represented as follows.

X ... cos(β+ω)
Y ... 0
Z ... sin(β+ω)

Figure 5:
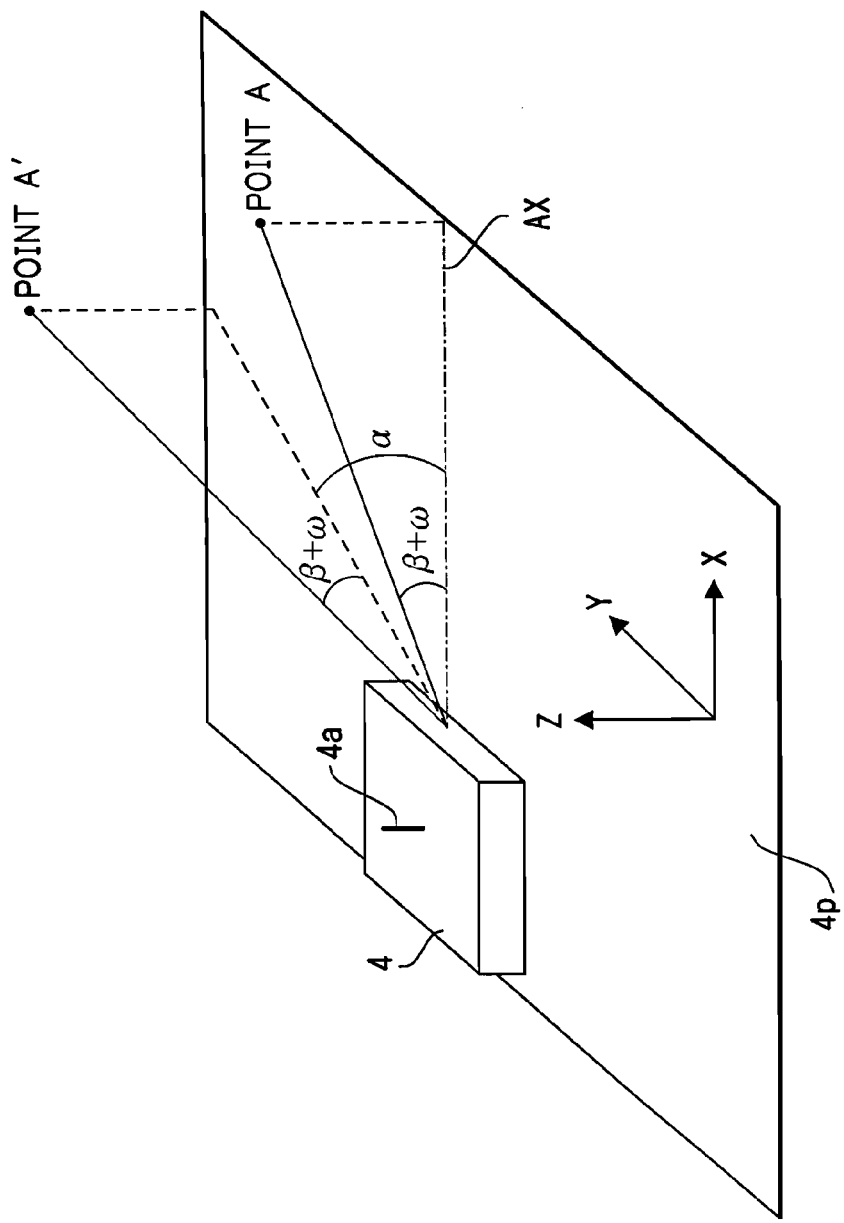
FIG. 5 is an explanatory illustration for deriving the conditions which the two-dimensional scanning projector according to the embodiment of the invention satisfies.

FIG. 5 illustrates a state where the lateral deflector 4 is rotated by a certain amount from the state shown in FIG. 4, and the light beam is deflected by an angle α (i.e., the half angle of view in the lateral direction). As shown in FIG. 5, when the light beam is deflected by the angle α, the point A moves to a point A'. The coordinate (X, Y, Z) of the point A' is represented as follows.

X ... cos α cos(β+ω)
Y ... sin α cos(β+ω)
Z ... sin(β+ω)

Figure 6:
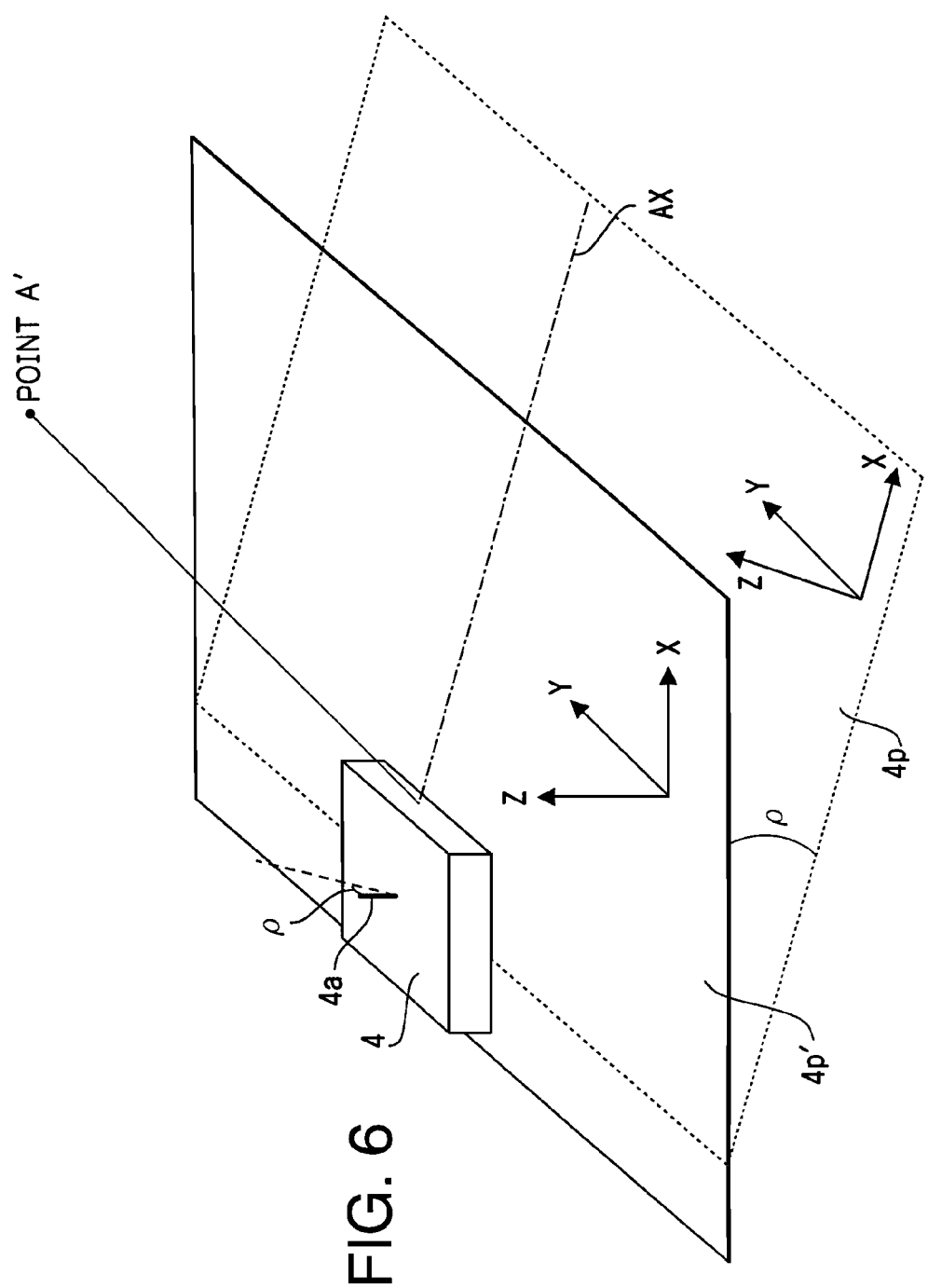
FIG. 6 is an explanatory illustration for deriving the conditions which the two-dimensional scanning projector according to the embodiment of the invention satisfies.

FIG. 6 illustrates a state where the lateral deflector 4 is inclined by a predetermined amount while keeping the state shown in FIG. 5. Specifically, the lateral deflector 4 shown in FIG. 6 is arranged such that the center axis 4a of the deflector 4 is inclined by the first angle ρ with respect to Z direction in the X-Z plane. Therefore, the rotational cross section 4p' of the inclined lateral deflector 4 is inclined with respect to the rotational cross section (horizontal surface) 4p. In FIG. 6, directions corresponding to X, Y and Z directions are defined as x, y and z directions, respectively.

As shown in FIG. 6, when the lateral deflector 4 is inclined, the coordinate (X, Y, Z) of the point A' is represented as follows.

X ... cos ρ cos α cos(β+ω)−sin ρ sin(β+ω)
Y ... sin α cos(β+ω)
Z ... sin ρ cos α sin(β+ω)+cos ρ sin(β+ω)

Figure 7:
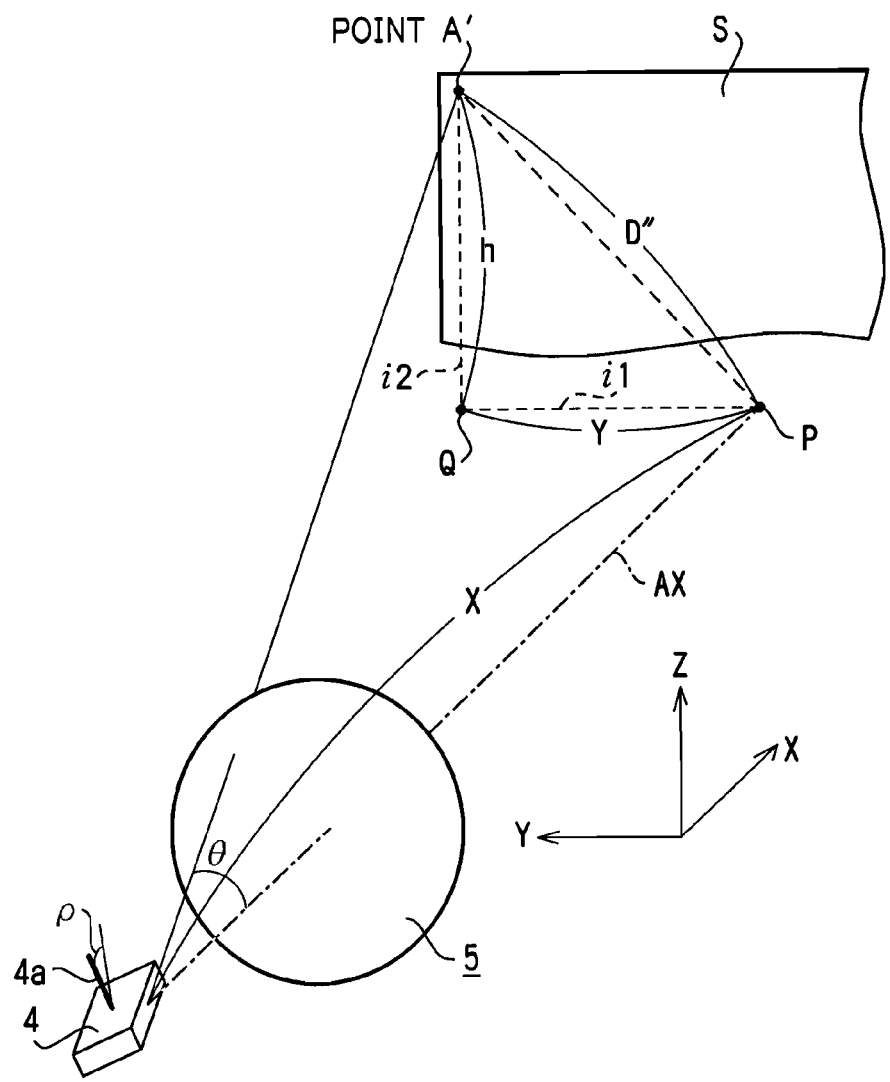
FIG. 7 is an explanatory illustration for deriving the conditions which the two-dimensional scanning projector according to the embodiment of the invention satisfies.

Based on the above described explanations, the condition (1) for projecting a high quality image not having the TV distortion and the trapezoidal distortion on the screen S is derived. FIG. 7 is an explanatory illustration for deriving the condition (1). In FIG. 7, it is assume that the point A' is positioned in the vicinity of one end of the upper side of the screen S.

The angle θ shown in FIG. 7 is defined as an angle formed between a normal (i.e., the optical axis AX) to the screen and a light ray proceeding to the point A'. The angle θ is obtained by the following equation.

$$\theta = D''/f \quad (4)$$

The tan θ can be derived by the following equation (5).

$$\tan\theta = \frac{\sqrt{(Y^2 + Z^2)}}{X} \quad (5)$$

Assume that h represents a distance between the point A' and an intersection Q between a virtual line i1 extending in Y direction from the intersection P and a virtual lime i2 extending downward from the point A' in z direction. The distance h can be obtained by the following equation (6).

$$h = D'' \frac{Z}{\sqrt{(Y^2 + Z^2)}} = D'' \frac{Z}{X\tan\theta} \quad (6)$$

Z/X in the equation (6) can be expressed, from the coordinate obtained with reference to FIG. 6, by the following equation (7).

$$\frac{Z}{X} = \frac{\sin\rho\cos\alpha\cos(\beta+\omega) + \cos\rho\sin(\beta+\omega)}{\cos\rho\cos\alpha\cos(\beta+\omega) - \sin\rho\sin(\beta+\omega)}$$

By canceling the right term with cos ρ cos α cos(β+ω), the following equation is obtained.

$$\frac{Z}{X} = \frac{\tan\rho + \tan(\beta+\omega)/\cos\alpha}{1 - \tan\rho\tan(\beta+\omega)/\cos\alpha} \quad (7)$$

By assigning the values obtained from the equations (5) and (7) to the equation (6), the following equation (8) relating to h is obtained.

$$h = \frac{D''}{\tan(D''/f)} \frac{\tan\rho + \tan(\beta+\omega)/\cos\alpha}{1 - \tan\rho\tan(\beta+\omega)/\cos\alpha} \quad (8)$$

When the distance h is equal to the distance H" between the intersection P and the center of the upper side of the screen S, the scanning line becomes a straight line. When the distance h is smaller than the distance H", the scanning line does not reach an end of the upper side of the screen S. That is, in this case, a non-display area is caused at an end of the upper side of the screen S. Therefore, in order to decrease the TV distortion and to prevent occurrence of the non-display area, the distance h and the distance H" are set to satisfy the following relationship.

h≥H"

By assigning the value of the equation (8) to the above described relationship and by multiplying both terms of the relationship by tan(D"/f)/D", the above described condition (1) is obtained.

Regarding the conditions (2) and (3), they can be derived as in the case of the condition (1), by changing the position of the point A' shown in FIG. 7.

In the following, two concrete examples of the two-dimensional scanning projector 100 according to the embodiment are explained. The configuration of each of the examples of the two-dimensional scanning projector 100 is shown in FIG. 2.

Table 1 shows a concrete numeric configuration of the relaying optical system 3 configuring the projecting optical system 10 according to each of the examples 1 and 2. Table 2 shows a concrete numeric configuration of the scanning optical system 5 configuring the projecting optical system 10 according to each of the examples 1 and 2.

TABLE 1

| Surface No. | r | d | n | Comments |
|---|---|---|---|---|
|  | — | 29.637 | — | Longitudinal deflector 2 |
| 1 | −22.400 | 4.000 | 1.650 | First Lens L31 |
| 2 | −530.012 | 4.544 |  |  |
| 3 | −72.720 | 7.096 | 1.764 | Second Lens L32 |
| 4 | −37.955 | 0.560 |  |  |
| 5 | −616.000 | 12.400 | 1.764 | Third Lens L33 |
| 6 | −48.400 | 0.560 |  |  |
| 7 | 166.600 | 10.192 | 1.529 | Fourth Lens L34 |
| 8 | −302.400 | 176.060 |  |  |
| 9 | 302.400 | 10.192 | 1.529 | Fifth Lens L35 |
| 10 | −166.600 | 0.560 |  |  |
| 11 | 48.400 | 12.400 | 1.764 | Sixth Lens L36 |
| 12 | 616.000 | 0.560 |  |  |
| 13 | 37.955 | 7.096 | 1.764 | Seventh Lens L37 |
| 14 | 72.720 | 4.544 |  |  |
| 15 | 530.012 | 4.000 | 1.650 | Eighth Lens L38 |
| 16 | 22.400 | 29.637 |  |  |
|  | — | — | — | Lateral deflector 4 |

TABLE 2

| Surface No. | r | d | n | Comments |
|---|---|---|---|---|
| | — | 25.60 | — | Lateral deflector 4 |
| 1 | −75.59 | 8.00 | 1.650 | First Lens L51 |
| 2 | 712.10 | 13.60 | 1.530 | (Cemented Lens) |
| 3 | −86.46 | 8.00 | | Second Lens L52 |
| 4 | −596.51 | 14.40 | 1.530 | Third Lens L53 |
| 5 | −220.00 | 2.40 | | |
| 6 | 3547.83 | 14.40 | 1.650 | Fourth Lens L54 |
| 7 | −651.65 | 920.00 | | |
| | — | 0.00 | | Screen S |

In each of Tables 1 and 2, r represents the curvature radius (unit: mm) of each surface of an optical element, d represents the thickness (unit: mm) of the optical element or a distance between optical elements, and n represents the refractive index.

The longitudinal deflector 2 in each of the examples 1 and 2 deflects the incident light beam within the range of ±30.2° in the longitudinal direction with respect to the optical axis of the relaying optical system 3.

The lateral deflector 4 according to the example 1 is arranged such that, when a reference axis orthogonal to the optical axis of the relaying optical system 3 is considered, the center axis 4a is inclined by 17° with reference to the reference axis. The lateral deflector 4 according to the example 2 is arranged such that the center axis 4a is inclined by 11° with respect to the reference axis.

When a reference axis orthogonal to the optical axis AX of the scanning optical system 5 in X-Z plane is considered, the deflector 4 is arranged such that the center axis 4a is inclined by 8° with reference to the reference axis. The lateral deflector 4 according to the example 2 is arranged such that the center axis 4a is inclined by 14° with respect to the reference axis.

The parameters of the above described conditions in the two-dimensional scanning projector 100 according to the example 1 configured as described above are shown in Table 3. The parameters of the above described conditions in the two-dimensional scanning projector 100 according to the example 2 are shown in Table 4.

TABLE 3

| Item | Unit | Condition (1) | | Condition (2) | | Condition (3) | |
|---|---|---|---|---|---|---|---|
| | | | (radian) | | (radian) | | (radian) |
| Screen Height Zs | mm | 420.0 | | 420.0 | | 420.0 | |
| Screen Width Ys | mm | 750.0 | | 750.0 | | 750.0 | |
| Screen Shooting Amount | mm | 350.0 | | 350.0 | | 350.0 | |
| Shooting Angle (β + ρ) | deg | 25.0 | 0.44 | 25.0 | 0.44 | 25.0 | 0.44 |
| ρ | deg | 8.0 | 0.14 | 8.0 | 0.14 | 8.0 | 0.14 |
| β | deg | 17.0 | 0.30 | 17.0 | 0.30 | 17.0 | 0.30 |
| ω | deg | 15.0 | 0.26 | 15.0 | 0.26 | 15.0 | 0.26 |
| α | deg | 29.5 | 0.52 | 29.5 | 0.52 | 29.5 | 0.52 |
| H″/H/H′ | mm | H″ = 560.0 | | H = 140.0 | | H′ = 350.0 | |
| D″/D/D′ | mm | D″ = 674.0 | | D = 400.3 | | D′ = 513.0 | |
| f | mm | 800.0 | | 800.0 | | 800.0 | |
| Left Term of Condition | | 0.956 | | 0.181 | | 0.517 | |
| Right Term of Condition | | 0.932 | | 0.191 | | 0.509 | |

TABLE 4

| Item | Unit | Condition (1) | | Condition (2) | | Condition (3) | |
|---|---|---|---|---|---|---|---|
| | | | (radian) | | (radian) | | (radian) |
| Screen Height Zs | mm | 420.0 | | 420.0 | | 420.0 | |
| Screen Width Ys | mm | 750.0 | | 750.0 | | 750.0 | |
| Screen Shooting Amount | mm | 350.0 | | 350.0 | | 350.0 | |
| Shooting Angle (β + ρ) | deg | 25.0 | 0.44 | 25.0 | 0.44 | 25.0 | 0.44 |
| ρ | deg | 14.0 | 0.24 | 14.0 | 0.24 | 14.0 | 0.24 |
| β | deg | 11.0 | 0.19 | 11.0 | 0.19 | 11.0 | 0.19 |
| ω | deg | 15.0 | 0.26 | 15.0 | 0.26 | 15.0 | 0.26 |
| α | deg | 28.3 | 0.49 | 28.3 | 0.49 | 28.3 | 0.49 |
| H″/H/H′ | mm | H″ = 560.0 | | H = 140.0 | | H′ = 350.0 | |
| D″/D/D′ | mm | D″ = 674.0 | | D = 400.3 | | D′ = 513.0 | |
| f | mm | 800.0 | | 800.0 | | 800.0 | |
| Left Term of Condition | | 0.934 | | 0.166 | | 0.498 | |
| Right Term of Condition | | 0.932 | | 0.191 | | 0.509 | |

As shown in Table 3, the two-dimensional scanning projector 100 according to the example 1 satisfies both of the conditions (1) and (2). As shown in Table 4, the two-dimensional scanning projector 100 according to the example 2 satisfies all of the conditions (1) to (3). The "screen shooting amount" shown in Tables 3 and 4 is a distance from the optical axis (or the normal to the screen passing through the center of the projecting optical system) to the center of the screen. In the case of FIG. 2, the "screen shooting amount" is a distance from the point P to the point Sc.

Figure 8:
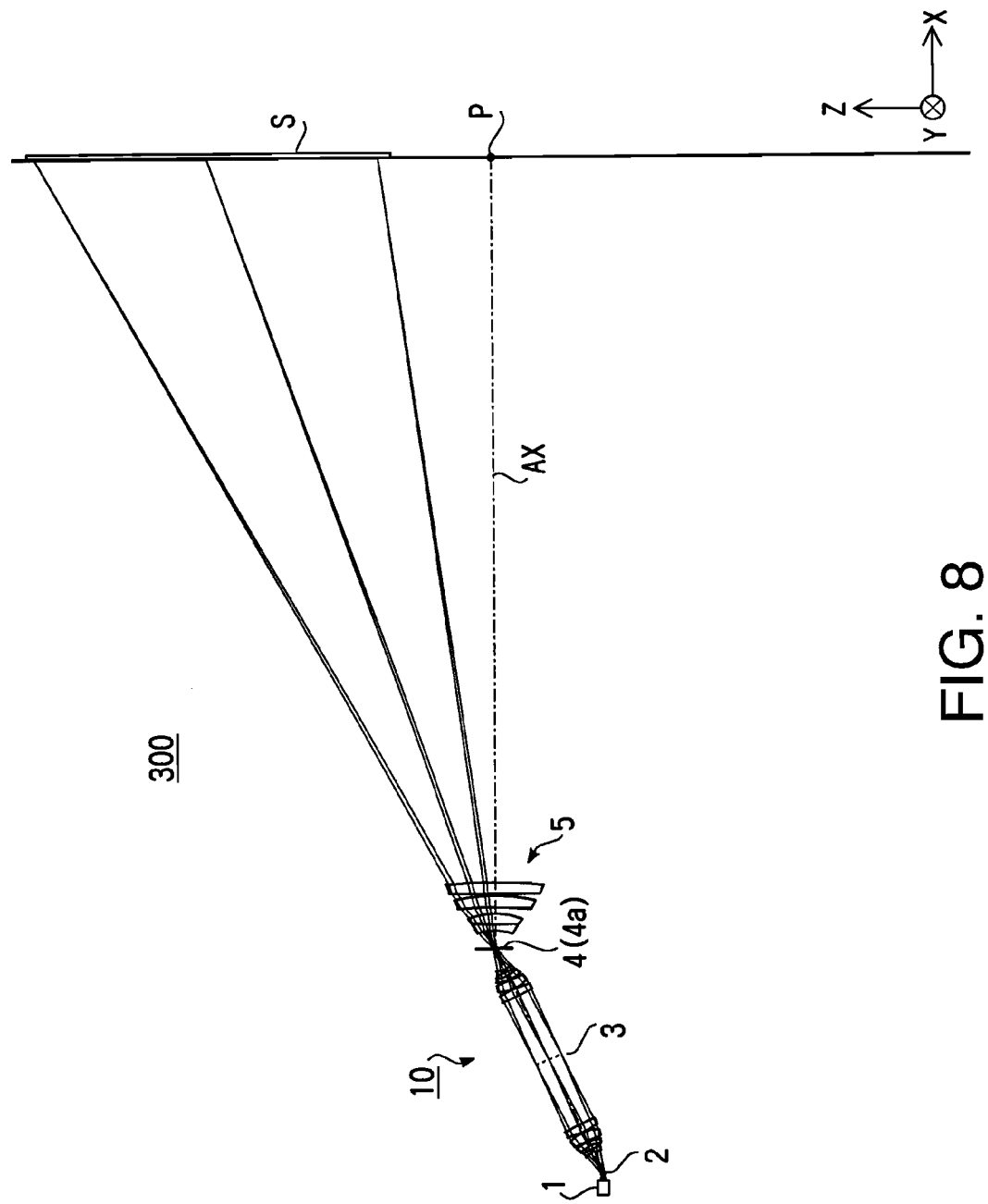
FIG. 8 illustrates a developed optical path of a two-dimensional scanning projector according to a comparative example.

Next, a two-dimensional scanning projector 300 which is a comparative example used to validate the advantages of the two-dimensional scanning projector 100 is provided. FIG. 8 illustrates the two-dimensional scanning projector 300 according to the comparative example. The two-dimensional scanning projector 300 according to the comparative example has the same configuration as that of each of the examples 1 and 2 excepting that the center axis 4*a* of the lateral deflector 4 is orthogonal to the optical axis AX of the scanning optical system 5 i.e., the lateral deflector 4 is not inclined. Therefore, in FIG. 8, to the same members as those shown in FIG. 2, the same reference symbols are assigned. The concrete numeric configurations shown in Tables 1 and 2 are also referred to as the concrete numeric configuration of a projecting optical system constituting the two-dimensional scanning projector 300 according to the comparative example.

In the two-dimensional scanning projector 300 according to the comparative example, the lateral deflector 4 is arranged such that, when the reference axis orthogonal to the optical axis of the relaying optical system 3 is considered, the center axis 4*a* is inclined with respect to the reference axis by 25°. Furthermore, the lateral deflector 4 in the comparative example is arranged such that the center axis 4*a* is orthogonal to the optical axis AX of the scanning optical system 5.

For the comparative example, Table 5 shows the parameters relating to the above described conditions.

TABLE 5

| Item | Unit | | Condition (1) (radian) | | Condition (2) (radian) | | Condition (3) (radian) |
|---|---|---|---|---|---|---|---|
| Screen Height Zs | mm | 420.0 | | 420.0 | | 420.0 | |
| Screen Width Ys | mm | 750.0 | | 750.0 | | 750.0 | |
| Screen Shooting Amount | mm | 350.0 | | 350.0 | | 350.0 | |
| Shooting Angle ($\beta + \rho$) | deg | 25.0 | 0.44 | 25.0 | 0.44 | 25.0 | 0.44 |
| $\rho$ | deg | 0.0 | 0.00 | 0.0 | 0.00 | 0.0 | 0.00 |
| $\beta$ | deg | 25.0 | 0.44 | 25.0 | 0.44 | 25.0 | 0.44 |
| $\omega$ | deg | 15.0 | 0.26 | 15.0 | 0.26 | 15.0 | 0.26 |
| $\alpha$ | deg | 31.9 | 0.56 | 31.9 | 0.56 | 31.9 | 0.56 |
| H"/H/H' | mm | 560.0 | | 140.0 | | 350.0 | |
| D"/D/D' | mm | 674.0 | | 400.3 | | 513.0 | |
| f | mm | 800.0 | | 800.0 | | 800.0 | |
| Left Term of Condition | | 0.989 | | 0.207 | | 0.549 | |
| Right Term of Condition | | 0.932 | | 0.191 | | 0.509 | |

As shown in Table 5, the two-dimensional scanning projector 300 according to the comparative example satisfies only one (i.e., the condition (2)) of the conditions (1) and (2).

Figure 9:
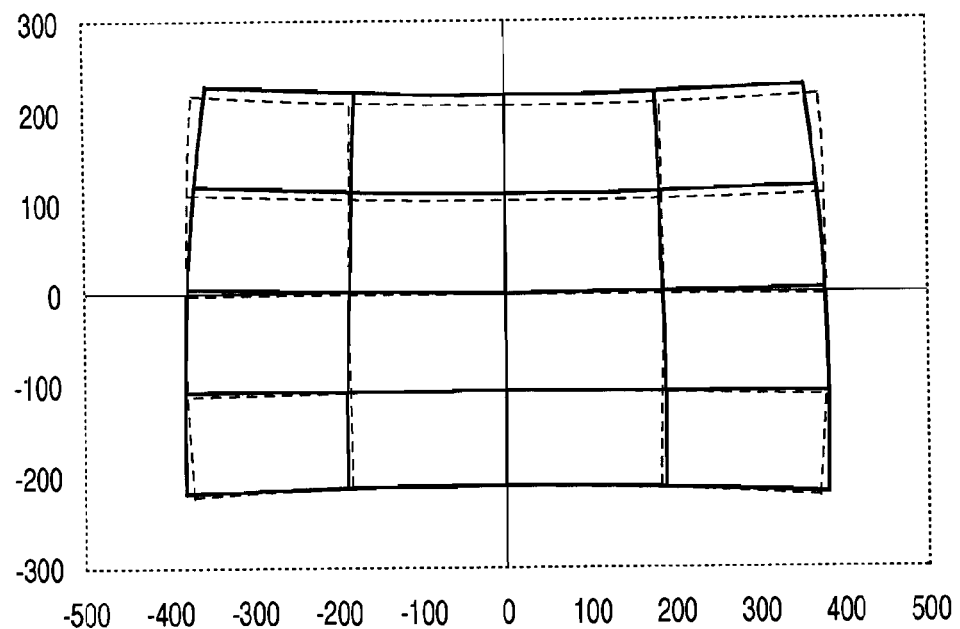
FIG. 9 illustrates a distorted state of an image projected by a two-dimensional scanning projector according to an example 1 of the invention.
Figure 10:
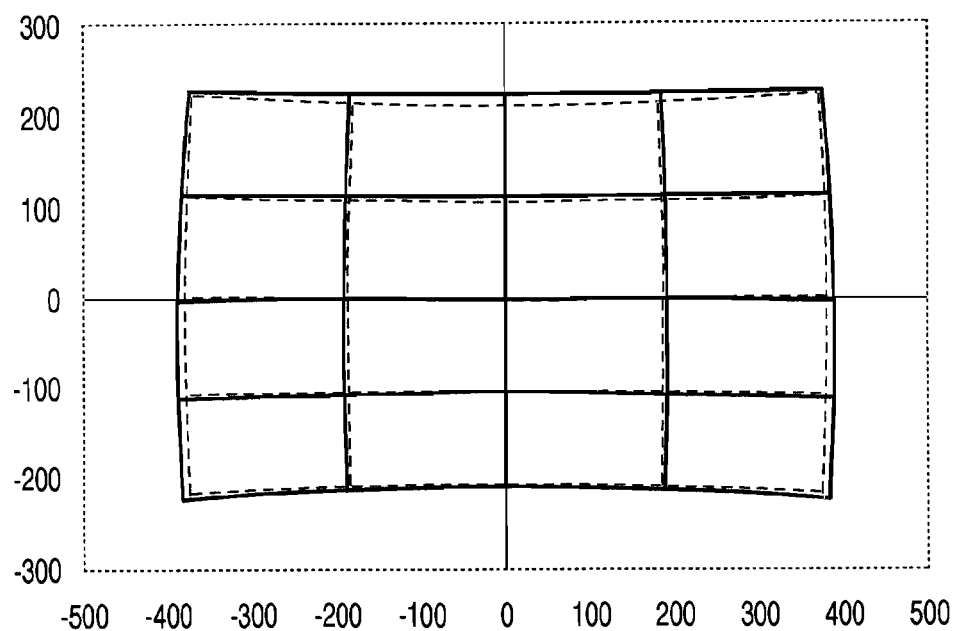
FIG. 10 illustrates a distorted state of an image projected by a two-dimensional scanning projector according to an example 2 of the invention.
Figure 11:
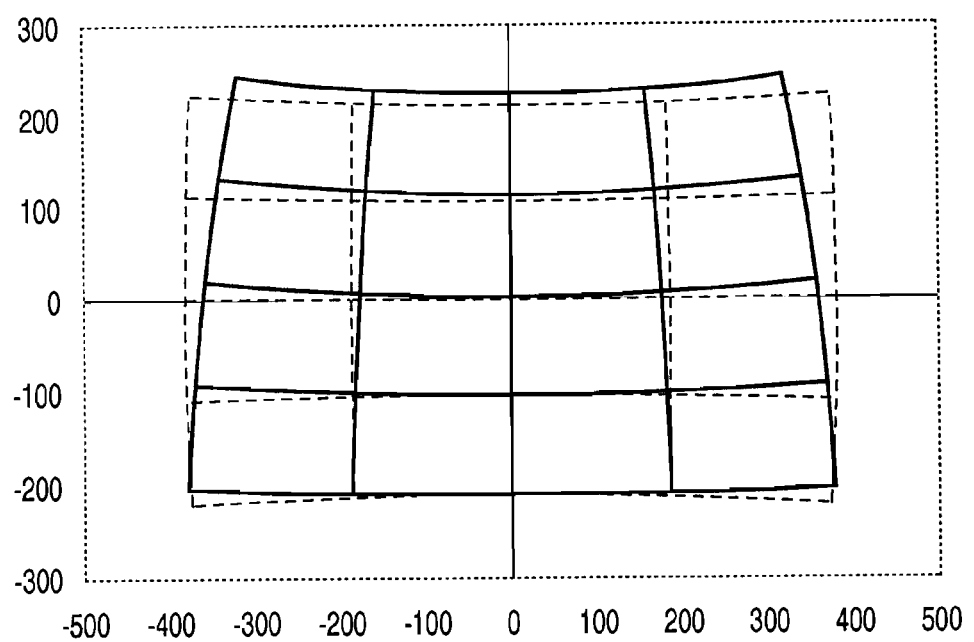
FIG. 11 illustrates a distorted state of an image projected by the two-dimensional scanning projector according to the comparative example.

FIGS. 9-11 are graphs illustrating the distorted statuses of images projected by the two-dimensional scanning projectors 100 according to the examples 1 and 2 and the two-dimensional scanning projector 300 according to the comparative example, respectively. In each Figure, a solid line represents the distorted status of an image projected by the projector 100 or 300. A dashed line represents a distorted status of an image projected by a non-shooting-up projection type projector configured, in each example, such that the optical axis of the projecting optical system is approximately orthogonal to the screen at the center of the screen.

As can be seen from the comparison between FIGS. 9, 10 and 11, when the two-dimensional scanning projector 100 according to each of the examples 1 and 2 is used, an image in which the TV distortion is sufficiently decreased to the extent of comparing favorably with that of the non-shooting-up type projector can be obtained. By contrast, it is understood that, in the two-dimensional scanning projector 300, the TV distortion and the trapezoidal distortion is caused largely.

The embodiment of the present invention has been explained. A two-dimensional scanning projector according to one embodiment of the invention is not limited to the configuration of the above described embodiment, and various variations can be made while achieving the same advantages as those of the above described embodiment.

For example, in the above described embodiment, all components configuring the scanning optical system 5 are lenses. The two-dimensional scanning projector according to one embodiment of the invention may employ a scanning optical system having a reflection surface contributing to keeping a constant velocity of the incident light beam, such as an fθ mirror. In the case of the shooting-up type projector like the present embodiment of the invention, a reflection surface for folding the optical path not a little is essential. Therefore, by using an fθ mirror as a part of the scanning optical system, it becomes possible to share components and thereby to decrease the number of components. As a result, it becomes possible to enhance the productivity of the entire device.

The effect of correcting the TV distortion by inclining the lateral deflector 4 becomes excessive to some extent in regard to the relationship with the scanning optical system 5 which has the fθ property. For this reason, the scanning optical system 5 is configured to be an optical system having a negative distortion smaller than the fθ property within a range of the correcting effect. For example, by configuring the scanning optical system 5 to have a negative distortion defined from the fθ property satisfying f(β+ω)≤H"≤f tan(β+ω) to the f tan θ property, it becomes possible to suppress the problem that a large angle of view specific to the scanning optical system having a large negative distortion lens is required, while maintaining the effect of correcting the TV distortion. As a result, it becomes possible to downsize the entire scanning optical system.

Figure 13:
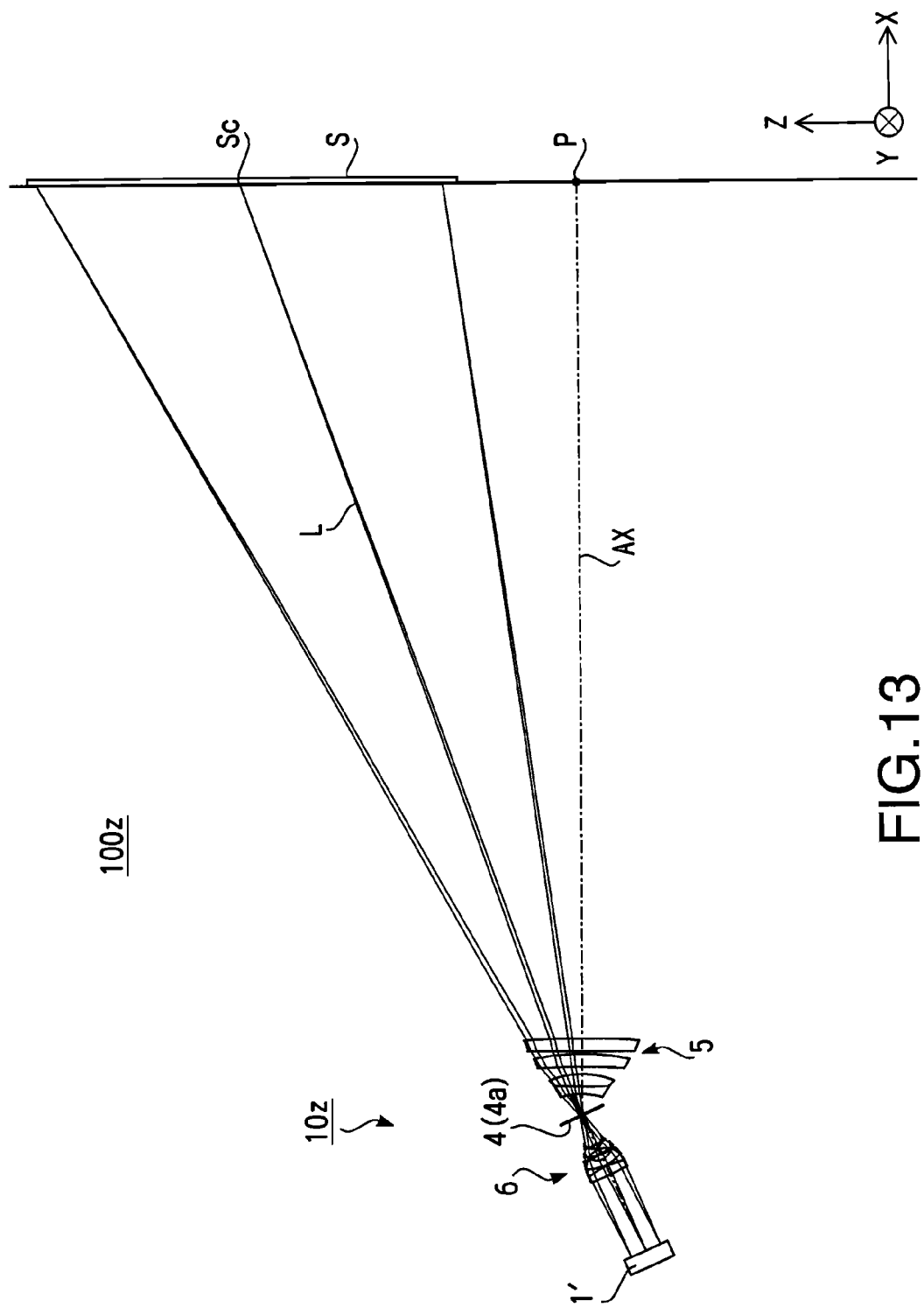
FIG. 13 illustrates a developed optical path of a two-dimensional scanning projector according to a variation of the invention.

In the above embodiment, the two-dimensional scanning is achieved by two deflectors. The two-dimensional scanning projector according to one embodiment of the invention is not limited to such a configuration. As a variation of the two-dimensional scanning projector according to one embodiment of the invention, FIG. 13 illustrates a two-dimensional scanning projector 100z in which the two-dimensional scanning is achieved by one deflector. Similarly to FIG. 2, FIG. 13 shows a developed optical path in the two-dimensional scanning projector 100z. In FIG. 13, to elements which are substantially the same as those shown in FIG. 2, the same reference symbols are assigned. As shown in FIG. 13, a projecting optical system 10z in the two-dimensional scanning projector 100z includes an array light source 1', the lateral deflector 4, the scanning optical system 5, and a collecting optical system 6. The array light source 1' is, for example, a light source including a plurality of light emitting units arranged along the direction corresponding to the longitudinal direction of the screen S. The collecting optical system 6 is arranged and configured such that all of the plurality of light beams emitted from the array light source 1' enter the lateral deflector 4. The light beam emitted from each of the light emitting units arranged in an array in the longitudinal direction form beam spots aligned, on the screen S, in a longitudinal line ranging from the upper side to the lower side of the screen S. Therefore, by causing the light beams emitted from the light emitting units to scan in the lateral direction one time with the lateral deflector 4, the whole image can be projected on the screen S. As a result, the two-dimensional scanning can be achieved.

What is claimed is:

1. A two-dimensional scanning projector for causing a light beam emitted from a light source to scan in a first direction and in a second direction, orthogonal to the first direction, thereby projecting a two-dimensional image onto a screen, the projector comprising:
a first deflector for deflecting the light beam in the first direction;
a scanning optical system arranged between the first deflector and the screen, the scanning optical system comprising optical components which are collinear with each other and define an optical axis of the scanning optical system, each of the optical components having a power rotationally symmetrical with respect to the optical axis;
wherein the optical axis intersects a plane in which the screen lies, and a center of the screen is at a location shifted in the second direction relative to the intersection of the optical axis and the plane;
wherein the first deflector has a rotation axis located in a plane including the optical axis and the second direction and which is inclined by a first angle with respect to the second direction;
wherein the first deflector is located whereby the light beam, emitted from the light source and in the plane including the optical axis and the second direction, forms a chief ray of the projected image and is obliquely incident on the first deflector at a second angle with respect to the optical axis;
a second deflector which is located between the light source and the first deflector for deflecting the light beam in the second direction;
a relaying optical system which is located between the first deflector and the second deflector and which directs the light beam from the second deflector to the first deflector; and
wherein the relaying optical system includes a front group of lenses adjacent to the second deflector and a rear group of lenses adjacent to the first deflector.

2. A two-dimensional scanning projector for causing a light beam emitted from a light source to scan in a lateral direction and in a longitudinal direction, orthogonal to the lateral direction, thereby projecting a two-dimensional image onto a screen, the projector comprising:
a first deflector for deflecting the light beam in the lateral direction;
a scanning optical system arranged between the first deflector and the screen, the scanning optical system comprising optical components which are collinear with each other and define an optical axis of the scanning optical system, each of the optical components having a power rotationally symmetrical with respect to the optical axis;
wherein the optical axis intersects a plane in which the screen lies, and a center of the screen is at a location shifted in the longitudinal direction relative to the intersection of the optical axis and the plane;
wherein the first deflector has a rotation axis located in a plane including the optical axis and the longitudinal direction and which is inclined by a first angle with respect to the longitudinal direction;
wherein the first deflector is located whereby the light beam, emitted from the light source and in the plane including the optical axis and the longitudinal direction, forms a chief ray of the projected image and is obliquely incident on the first deflector at a second angle with respect to the optical axis;
a second deflector which is located between the light source and the first deflector for deflecting the light beam in the longitudinal direction;
a relaying optical system which is located between the first deflector and the second deflector and which directs the light beam from the second deflector to the first deflector; and
wherein the relaying optical system includes a front group of lenses adjacent to the second deflector and a rear group of lenses adjacent to the first deflector.

* * * * *